May 14, 1940.　　　A. C. FISCHER　　　2,200,269
SHEET FORMING APPARATUS AND METHOD
Filed March 20, 1936　　　2 Sheets-Sheet 1
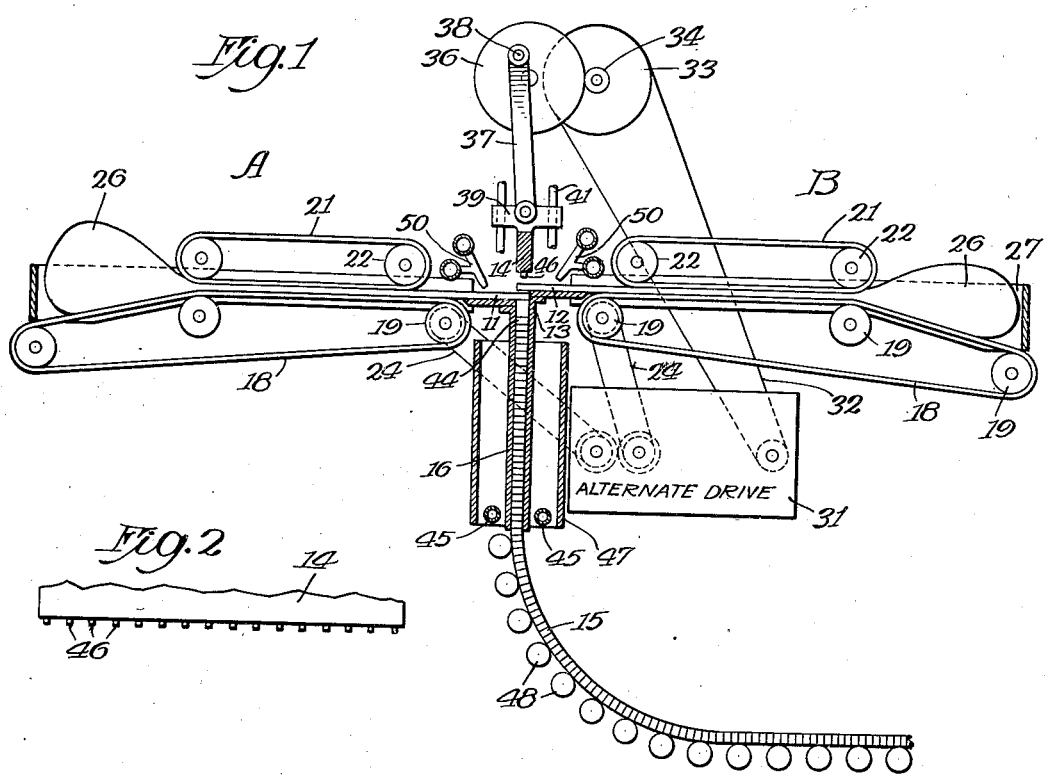
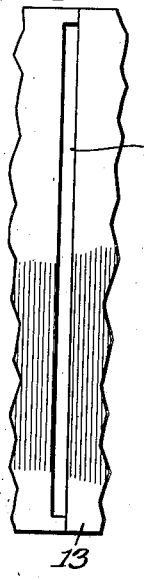
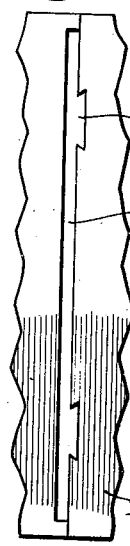
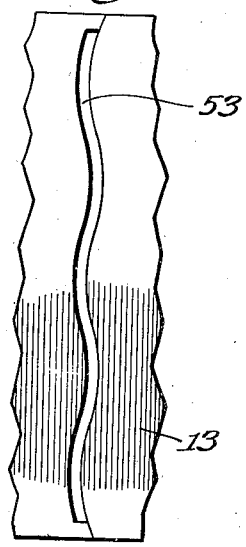
Inventor:
Albert C. Fischer
By Louis Robertson Atty.

May 14, 1940.  A. C. FISCHER  2,200,269

SHEET FORMING APPARATUS AND METHOD

Filed March 20, 1936   2 Sheets-Sheet 2

Inventor:
Albert C. Fischer
By Louis Robertson Atty.

Patented May 14, 1940

2,200,269

UNITED STATES PATENT OFFICE 2,200,269

SHEET FORMING APPARATUS AND METHOD

Albert C. Fischer, Chicago, Ill.

Application March 20, 1936, Serial No. 69,814

16 Claims. (Cl. 154—1)

This invention relates to a method of and apparatus for forming sheets, and in its apparatus aspect has been illustrated as embodied in apparatus for forming sheets by alining and compressing narrow strips which are preferably of successively contrasting colors. Sheets for which this invention is especially suitable are also disclosed in this application. The term "sheet" is used for convenience, and is not intended to imply any particular dimensions, for although the preferred form of the finished product, being suitable for shingles or tiles, is fairly thin, yet the invention is also applicable to thick slabs or even to blocks. Furthermore, although the sheet is formed continuously, it may be cut up into any sizes desired.

In the illustrated form of the invention, two webs are formed of a plastic fibrous mixture or of any plastic, and the edges of these webs are advanced over a die whereupon a plunger severs narrow strips from the edge of each web and presses them down into a compacting nozzle where they are compacted against previously formed strips to which they adhere, and to which they are preferably further bound by an interlacing of fibers. As more strips are added, a continuous sheet is extruded from the far end of the nozzle, and it may be cut off into the desired lengths and given any further treatment that may be necessary.

An object of the invention is to provide a simple method for forming sheets of a composite character, and particularly sheets having a longitudinally extending succession of laminations, and, if desired, having these laminations extend along curved or angular lines of predetermined shape.

Another object of the invention is to provide a simple form of apparatus for manufacturing such a sheet.

A further object is to provide a laminated structure in which the laminations are secured together more firmly than in any such sheets which may have been proposed heretofore.

Other objects and advantages of my invention will be apparent from the following description, taken with the drawings, in which:

Fig. 1 is a diagrammatic sectional view of one form of apparatus embodying this invention.

Fig. 2 is a fragmentary side elevation of the plunger shown in Fig. 1.

Figs. 3, 4 and 5 are plan views showing the shape of the die by which the cross section of the finished sheet is determined.

Fig. 11 is a fragmentary view showing in cross section one of the many sheets that can be made on this apparatus.

Figure 10:
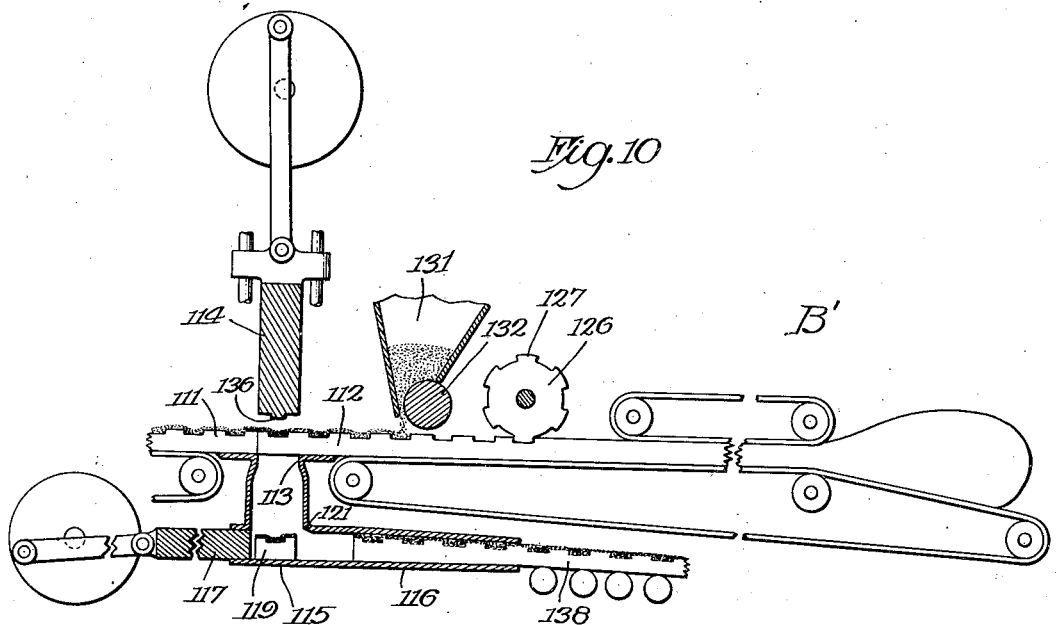
Fig. 10 is a diagrammatic view of a modified form of the apparatus embodying this invention.

Although this invention may take numerous forms, only two have been chosen for the purpose of illustration. According to this form the apparatus includes two web-forming units A and B which may be of any type desired and which deliver the webs 11 and 12 over the die 13 into which reciprocates a plunger 14 cutting strips from the web and pressing them through the die 13 and then through the nozzle 16 which forms a continuation of the die 13. The joined strips leave the nozzle 16 in the form of a sheet 15.

The illustrated type of web forming unit includes a wide belt 18 extending around any suitable number of rollers 19, and another wide belt 21 extending around any suitable number of rollers 22. Any or all of the rollers 19 and 22 may be driven as by chains 24. A batch 26 of any suitable material is deposited on the belt 18 which extends beyond the belt 21 for this purpose. This batch may be deposited from time to time by hand or continuously by a hopper, and the belt 18 may slant at the point of deposit or not, depending on the consistency of the material and the particular forming action desired.

As the material 26 is drawn between the rotating belt 18 and the rotating belt 21, it is flattened out to form one of the webs 11 or 12. Fixed shields 27 may be provided along the sides of the belts and at the end of belt 18 to prevent the material from running off the belt.

The material used may be any material which is of a plastic and cohesive nature, such as plastics, resins, Portland cement, or any other materials, with which there is preferably mixed any suitable fibrous material such as asbestos, though some plastics may be used alone. The material supplied to the unit A is preferably of a different color from that supplied to the unit B so as to produce ornamental effects in the resulting sheet 15, and in the tiles, slabs, shingles, or other products which are finally made therefrom.

The belts 18 and 21 are not driven continuously but are driven intermittently by any suitable driving mechanism indicated diagrammatically at 31. During the period when the drive mechanism 31 is not driving the chains 24 which drive the belts 18 and 21, it drives a chain 32 which extends around a sprocket wheel 33 which drives a pinion 34 which in turn drives a toothed crank wheel 36. A connecting rod 37 is connected to the crank wheel 36 by a crank pin 38 and is also pivotally connected to a cross head 39 which slides along fixed guideways 41 supported in any suitable manner. The plunger 14 is carried by the cross head 39 and is reciprocated by it into and out of the die 13.

The drive mechanism 31 is constructed to feed the two webs 11 and 12 to the position illustrated and then to cause the plunger 14 to be driven down to cut narrow strips from the webs 11 and 12, which strips are the width of the die 13. The plunger comprises these newly cut strips against the upper strip 44 of those previously cut, and thus causes them to adhere together. In order that the strips will be compacted together with sufficient firmness, the nozzle 16 has its walls converging as illustrated, so that the movement of the strips therethrough is frictionally retarded. The walls may be heated by burners 45 in furnace 47 if necessary to keep the material from sticking to the walls of nozzle 17. The amount that these walls converge, together with the consistency of the material and the temperature of the walls, will determine the degree to which the strips are compacted and the firmness with which they are pressed together. The material should be stiff enough to offer considerable opposition to passing through the nozzle.

In order to unite these strips more firmly, it is preferred that the bottom face of the plunger 14 be provided with a series of pegs 46 which may extend entirely along the length of said surface as illustrated in Fig. 1. These pegs will form pockets in each strip as it presses the strip into the die 13 and in turn will press portions of the succeeding strips into said pockets, thus completing an inter-engagement of the successive strips. This inter-engagement is especially effective if the material used is fibrous, since in that event the fibers will thus be caused to interlace with one another.

If the webs 11 and 12 should be fairly thick, so that the action of the plunger 14 or the pegs 46 is not satisfactory when it works on both webs 11 and 12 at once, the drive mechanism 31 may be changed to drive units A and B alternatively, driving the plunger 14 in between each of the feeding movements. The result of this will be that the plunger 14 will first cut off and press down a strip from the web 11 and next cut off and press down a strip from the web 12. With this alternate movement, the two webs 11 and 12 may be at the same level.

The method of making the sheets is believed to be quite clear from the foregoing description, although it should be understood that it could be practiced without the illustrated apparatus. Individual strips could be formed in any way and pressed one against another sequentially to form a sheet. The use of a nozzle such as a nozzle 16 would of course be extremely helpful in this connection and may be considered as definitely a part of the preferred method. Likewise, the method is especially practical when one or more strips are cut off and pressed against preceding strips by the same motion of a plunger.

After the sheet 15 has been formed it may be treated in any desired manner as by cutting it into the desired sizes for shingles, tiles, or any other products, and finishing these products by drying or baking them in a press if desired. Of course if accuracy of shape is not necessary, the products may be dried or baked without the use of a press, but with most materials a stronger product will result if pressure is used during hardening.

The cross section of the die 13 and of the nozzle 16 may take many forms to produce many forms of sheets. Thus, as illustrated in Fig. 3, the die 13 may have an opening 51 therein which is simply rectangular in shape to form a flat sheet. As illustrated in Fig. 4, the opening 51' in the die may have enlarged portions 52 therein which will form a sheet having raised portions extending therealong. Such a sheet may be especially suitable for tiles. As illustrated in Fig. 5, the die 13 may have an opening 53 therein which will produce a corrugated sheet. It should be understood that in each case in which the die is specially shaped, the nozzle 16 and the plunger 14 will be of a shape corresponding to that of the die and, if desired, the rollers 48 may also be shaped to conform to the shape of the extruded sheet. The nozzle 16 may be specially shaped even though the die is not especially shaped when the material is quite plastic.

Although only three shapes have been illustrated for the slot in the die, the number of possible shapes is almost unlimited, and it is even possible to form continuous tubes or other such special forms. Shapes such as those shown in Figs. 3 and 5 in which the slot is of uniform width throughout its length are especially advantageous because of the fact that there is no waste between successive strips cut from a single web. With the form shown in Fig. 4, the waste from the web 12 may be left on top of the web 11, in which case it will be carried above the die on the next movement of the strip 11, so that there will in fact be no waste in this form either. With this form it may be desirable to move the strip 12 farther than the strip 11 is moved on each feeding movement.

Figure 6:
Figs. 6 and 7 are fragmentary elevational views of modified forms of plungers.
Figure 8:
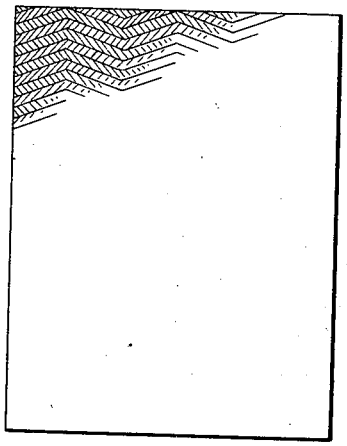
Figs. 8 and 9 are face views of the shingle resulting from the use of the plungers of Figs. 6 and 7.

The plunger 14 will produce a sheet in which the stripes run straight across the sheet. If it is desired to have the stripes appear other than straight, the plunger 14 may have its bottom surface shaped to correspond to the shape of stripe desired. For example, the plunger 14 may be replaced by a plunger 14a shaped as seen in Fig. 6, with an angular bottom surface, to which may be added the pegs 46 if desired. A plunger of this shape will give each of the strips a corresponding shape as it cuts them off, and this shape will be substantially retained in the further compacting, so that the finished sheet will have the appearance shown in Fig. 8 in which the cross hatching may represent any two contrasting colors, although a single color could be used if preferred.

Figure 7:
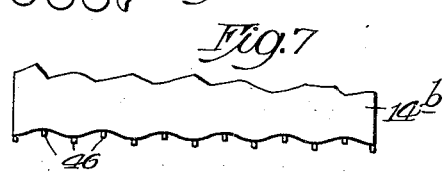
Figure 9:
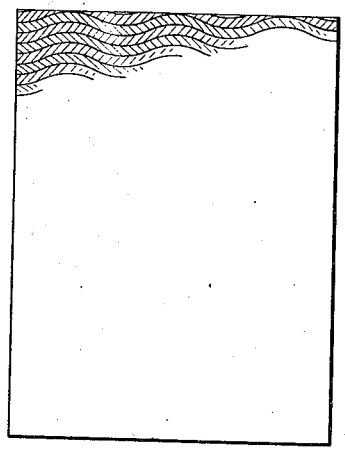

In Fig. 7 is illustrated a plunger 14b having a curved bottom surface to which the pegs 46 may also be added if desired. From the foregoing discussion it will be clear that this plunger will produce a sheet having the appearance illustrated in Fig. 9.

In case the webs 11 and 12 are not formed of a material which will cause the strips to be sufficiently bound together, or, in case any special color effects may be desired between the laminations, spray guns 50 may be provided. There will preferably be a series of such spray guns 50 located across the width of each of the webs, each series being connected to a pair of headers as shown, one for compressed air, and one for the material being sprayed. This material may be an adhesive material such as glue, and may be colored with a dye or otherwise. It will be obvious that when the strips are severed and pressed together there will be a layer of glue between each pair of strips.

Although the apparatus has been illustrated very diagrammatically, it is believed that its construction is nevertheless quite clear. It will be obvious that all of the parts will be supported from a suitable framework and that many details not shown may be supplied. The drive mechanism may include its own motor or motors, or may be driven by an external motor. Instead of a single crank wheel 36 and a single connecting rod 37 there may be a pair or more of these elements for the sake of stability in the operation of the plunger 14. Likewise, instead of a simple cross head of the type shown, there may be a cross head having two spaced cross bars providing greater accuracy in the positioning of the plunger 14. Although a chain drive has been illustrated, the parts could of course be driven in any other manner and they might even be driven by separate motors if there is provided some automatic means for starting the parts in the right sequence and stopping them in the right positions.

The web-forming units A and B illustrated may be replaced by any other suitable type of web-forming apparatus such as paper-making machines, extruding machines (see Patent No. 2,011,160, issued August 13, 1935, to Plepp) or by other forms of machines similar to that illustrated for rolling out the web. Likewise the plunger reciprocating apparatus may be replaced by other apparatus performing the same function. It should also be noted that the two webs need not necessarily approach the die from opposite directions, but may lie one over another, in which case there may be any desired number of webs having different characteristics or colors. When a variegated product is not desired, a single one of the web-forming units may be used, or they may both be used with the same material.

In Fig. 10 has been illustrated a modified form of apparatus constructed in accordance with this invention. In this form there is a web forming unit B' similar to those shown in Fig. 1, though preferably adjusted to form a thicker web 112 of material. There may be a similar such unit forming a web 111 approaching from the opposite side.

A plunger 114 may be provided similar to the plunger 14 and operated in the same manner. It need not include the pegs 46, since they would have little or no advantage in this instance. The plunger 114 operates through a die 113 and cuts off strips of the material, each of which drops freely onto a bed 115 along which it is slid by a second plunger 117 which is reciprocated in a manner similar to that shown for plunger 14, and operates to press the severed strips 119 successively into and eventually through a nozzle 116, the walls of which converge except at the portion wherein the plunger reciprocates. It should be noted that in all instances the plunger should reciprocate between walls so spaced that there will be no undue oozing between the walls and the plunger. A little oozing may be beneficial in interlocking the strips to one another. Of course the plunger should not fit so tightly between the walls of the nozzle as to objectionably entrap air. Vents may be provided if desired, especially above the area of forceful compacting. In the case of Fig. 10, the entrance to the nozzle 116 may be slightly flared to facilitate pressing the strips into said nozzle.

Above the paths of the webs 111 and 112 there may be provided a groove-forming roll 126 having projections 127 formed on its surface. These projections may be in the form of ribs extending the width of the web 12 and making grooves entirely across the web, or they may be of shorter extent, making small depressions in the web.

Beyond the roll 126 there may be provided a hopper 131 for feeding an additional material to the surface of the web 112. This hopper may extend substantially to the surface of the web so as to fill the depressions therein, or there may be provided a feeding mechanism 132 to sprinkle a uniform layer of the added material thereon. This added material may be granular, fibrous, or plastic in nature, and if fibrous it may be preferred to have a separate device for forming a web of the fibrous material to be superimposed on the web 112. One material that might be used in this manner is rock wool. It might also be desired in some instances to insert bars or tubes of metal or other material in the grooves formed by the roll 126. This could be done by a feeding device or by hand.

In order to maintain the grooves when the strips are cut from the web, the plunger 114 may be provided with a rib 136 corresponding in shape to the ribs 127 on the roll 126. If the added material is applied over the entire surface of the web 112, the plunger 114 will tend to press this added material into the plastic material, at the same time that it severs the strips therefrom.

As the plunger 117 presses the strips 119 into the nozzle 116 and compacts them against the preceding strips to form the sheet 138, it will change the shape of the groove in the strip 119, tending to close it and thereby lock the added material in place. This may be especially valuable in connection with such a material as rock wool, since it will hold the wool firmly while leaving the surface portion of the wool comparatively free so that its insulating value will not be impaired.

The various parts of the apparatus of Fig. 10 would of course be driven in the necessary sequential order by any means such as a gear box such as that illustrated diagrammatically at 31 in Fig. 1. In this instance one of the webs 111 or 112 is advanced to a position over the die 113 where it is stopped while the plunger 114 cuts off a strip and deposits it on the plate 115. As the plunger 114 returns to its original position, the plunger 117 may operate to press the severed strip 119 into the nozzle 116 and compact it onto the end of the sheet 138. As soon as the plunger 114 is out of the way, the web 112 or the other web 111 may be advanced. The plungers 114 and 117 may be stopped in the positions shown, or their timing may be such that the crank wheels for operating these plungers need not be stopped.

From the foregoing it is evident that a wide variety of products may be formed by the apparatus and method of this invention. Thus there may be formed a striped sheet material from which may be cut tiles, shingles, roofing sheets, etc., in which the stripes may appear as parallel straight lines, curved lines, angular lines, or irregular lines of any desired shape. In all these forms the strips forming the stripes may be secured together by cohesion, by interlacing the fibers, and also by being cupped into one another by the pegs 46. Also, in all of these forms the cross section of the sheet may be rectangular or it may have specific shapes such as those shown in Figs. 4 and 5 for example. The stripes may be formed of different materials if this should be desired. Composition sheets may also be formed, by the form of apparatus and method illustrated in Fig. 10, in which each strip comprises two layers, one on one side of the sheet and one on the other. In this instance the base layers may be any plastic material of such nature that the strips will adhere to one another, and the surface material may be of almost any nature imaginable, such as metal particles or filings, fibrous materials of a vegetable nature or otherwise, such as rock wool, or any granular material or any mastic. For example, a slate surfaced sheet 151 for roofing may be made by using a base of Portland cement with or without asbestos fibers, or a mixture of elastic material and fibers, and sprinkling the crushed slate or similar granular material thereon. In this instance it may be desired to omit the roll 126 and the rib 136 so as to have a relatively smooth surface, since the action of the plungers 114 and 117 will work the granules into the materials sufficiently. If desired, the plunger 114 may press the strips against the plate 115.

Although but one embodiment of my invention has been herein shown and described, it is to be understood that the invention is not limited thereby, but is to be limited only by the prior art. The following claims are intended to point out some of the features now recognized as new, rather than to limit the invention to these features.

I claim:

1. The method of continuously forming thin hard slabs which includes the steps of continuously forming strips of a width approximately equal to the thickness of the desired slabs of a plastic and cohesive material capable of hardening, continuously and successively pressing said strips together into adhesive engagement with each other while the material is in its plastic state to form a sheet having the edges of said strips exposed on its face, cutting slabs from said sheet, and causing said slabs to harden.

2. The method of making continuously variegated sheets which includes the steps of conjointly cutting a plurality of flat strips of cohesive material of a width approximately equal to the desired thickness of the sheet of different materials of contrasting appearance and repeatedly pressing the contrasting strips successively into interengagement with each other to form a thin sheet having the edges of said strips exposed on its face, the pressing step including the pressing occasioned by subsequent cutting operations.

3. The method of making continuously variegated sheets, which includes the steps of conjointly cutting a plurality of flat strips of cohesive material of a width approximately equal to the desired thickness of the sheet of different materials of contrasting appearance and repeatedly pressing the contrasting strips successively into interengagement with each other against a force of increasing frictional resistance to form a thin sheet having the edges of said strips exposed on its face.

4. The method of making continuously variegated sheets which includes the steps of forming a plurality of layers of cohesive material of contrasting appearance, moving said layers intermittently from opposite directions to place their edges in alinement with a constricted passage, cutting strips from said layers and pressing each face to face against the preceding strips into said passage.

5. The method of making variegated sheets which includes the steps of forming a plurality of layers of cohesive material of contrasting appearance, moving said layers repeatedly from opposite directions to place their edges between two cutting members and at the same time in alinement with a constricted passage, cutting strips from said layers and pressing each face to face against the preceding strip by moving a plunger across and between the cutting members and into said passage.

6. The method of making continuously thin sheets which includes the steps of forming numerous flat strips of cohesive material of a width approximately equal to the desired thickness of the sheet, and repeatedly pressing them face to face successively to form a thin sheet having the edges of said strips exposed on its face, and distorting said strips into one another to secure them together more reliably.

7. The method of making sheets, which includes the steps of forming a layer of cohesive material, moving said layer repeatedly to place its edge beyond a cutting member and at the same time in alinement with a constricted passage, cutting strips from said layer and pressing each face to face against the preceding strip by moving a plunger having pegs on its face across the cutting member and into said passage.

8. Apparatus for making sheets, including means for forming a layer of plastic cohesive material, means for cutting strips from said layer, and means for pressing said strips together face to face to form a sheet having the edges of the strips exposed on its surfaces, and projecting means on said pressing means for distorting said strips into one another to secure them together more reliably.

9. Apparatus for making sheets including means for forming a layer of plastic cohesive material, means for cutting strips from said layer, and means for pressing said strips together face to face successively and continuously to form a sheet having the edges of the strips exposed on its surfaces, including a constricted nozzle and a reciprocating plunger having pegs on its face, for pressing successive strips into said nozzle and causing the sheet to be extruded therefrom.

10. The method of forming continuously a sheet having an irregular surface, including the steps of cutting a plurality of strips having faces shaped approximately as the cross section of the desired sheet from a layer of cohesive plastic material, and pressing said strips successively into adhesive interengagement with each other to form a sheet of said cross section.

11. The method of continuously making thin sheets which includes the step of forming flat layers of cohesive material by successively cutting said layers into narrow strips, pressing said layers into adhesive engagement face to face successively, and distorting said layers into one another to secure them together more reliably to form a thin sheet with the edges of the layers exposed in the faces of the sheet.

12. The method of making thin sheets which includes the steps of forming a layer of cohesive material, cutting said layer into a plurality of flat strips of a width approximately equal to the desired thickness of the sheet, and pressing said strips successively into contact with each other against the force of an increasing frictional resistance.

13. The method of making sheets which includes the steps of forming a layer of cohesive material, cutting strips from said layer of a width approximately equal to the desired thickness of the sheet, and pressing each of said strips face to face against the preceding strip against the force of an increasing frictional resistance, and heating the strips in the course of the pressing operation.

14. In an apparatus for producing sheets comprising means for forming a layer of plastic cohesive material, means for cutting strips from said layer, and means for pressing said strips together face to face successively and continuously to form a sheet having the edges of the strips exposed on its surfaces, including a constricted nozzle and a reciprocating plunger with a non-planar end for pressing successive strips into said nozzle and causing the sheet to be extruded therefrom.

15. In an apparatus for producing sheets comprising means for forming a layer of plastic cohesive material, means for cutting strips from said layer, and means for pressing said strips together face to face successively and continuously to form a sheet having the edges of the strips exposed on its surfaces, including a constricted nozzle and a reciprocating plunger with a non-planar end fitted with pegs thereupon for pressing successive strips into said nozzle preparatory to the extrusion of the strips therefrom in sheet form.

16. In an apparatus for producing sheets comprising means for forming a plurality of layers of plastic cohesive material, means for feeding said layers of material from different sources to a common location, means for simultaneously cutting strips from said layers, and means for pressing said strips together face to face successively and continuously to form a sheet having the edges of the strips exposed on its surfaces, including a constricted nozzle and a reciprocating plunger for pressing successive strips into said nozzle and causing the sheet to be extruded therefrom.

ALBERT C. FISCHER.